United States Patent
Cahill, III (10) Patent No.: US 6,377,308 B1
(45) Date of Patent: *Apr. 23, 2002

(54) METHOD AND APPARATUS FOR LINE-SPECIFIC DECODING OF VBI SCAN LINES

(75) Inventor: Benjamin M. Cahill, III, Ringoes, NJ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/769,151

(22) Filed: Dec. 18, 1996

Related U.S. Application Data (63) Continuation-in-part of application No. 08/670,565, filed on Jun. 26, 1996.

(51) Int. Cl.⁷ ............................ H04N 7/00; H04N 7/08; H03L 7/00
(52) U.S. Cl. ....................... 348/461; 348/461; 348/465; 348/473; 348/478
(58) Field of Search ................................ 348/473–479, 348/465–468, 547, 461

(56) References Cited

U.S. PATENT DOCUMENTS

| | | | | |
|---|---|---|---|---|
| 4,380,027 A | * | 4/1983 | Leventer et al. ............ 358/147 |
| 4,502,077 A | | 2/1985 | Morotomi et al. .......... 348/614 |
| 4,600,943 A | | 7/1986 | Tanabe ....................... 348/468 |
| 4,658,294 A | * | 4/1987 | Park .......................... 348/464 |
| 4,667,235 A | * | 5/1987 | Nozoe et al. ............... 348/464 |
| 4,691,354 A | * | 9/1987 | Palminteri ................. 348/476 |
| 4,774,715 A | | 9/1988 | Messenger ................. 375/208 |
| 4,896,213 A | * | 1/1990 | Kobo et al. ................ 348/478 |
| 5,089,892 A | | 2/1992 | Koguchi et al. ............ 348/614 |
| 5,293,235 A | | 3/1994 | Ko ............................ 348/614 |
| 5,311,311 A | * | 5/1994 | Harigai et al. ............. 348/476 |
| 5,311,312 A | | 5/1994 | Oh ............................ 348/614 |
| 5,319,453 A | * | 6/1994 | Copriviza et al. .......... 348/476 |
| 5,321,750 A | * | 6/1994 | Nadan ........................ 380/20 |

(List continued on next page.)

FOREIGN PATENT DOCUMENTS

| | | |
|---|---|---|
| EP | 0516 216 A2 | 12/1992 |
| EP | 0552577 A1 | 7/1993 |
| EP | 0 617 551 A1 | 9/1994 |
| JP | 4-227378 | 8/1992 |
| JP | 08317254 | 11/1996 |
| WO | 94/27422 | 11/1994 |

OTHER PUBLICATIONS

"Joint EIA/CVCC Recommended Practice for Teletext: North American Basic Teletext Specification (NABTS), EIA Standard : EIA –516, May 1988, pp: Cover, Preface, i–vi, 1–5v and 62–65.

"Recommended Practice for Line 21 Data Service",EIA Standard: EIA –608, Sep.1994,pp: Cover, i–vi, and 7–9.

Primary Examiner—Reinhard J. Eisenzopf
Assistant Examiner—Paulos M. Natnael
(74) Attorney, Agent, or Firm—Blakely, Sokoloff, Taylor & Zafman LLP (57) ABSTRACT

Prior art methods of decoding a vertical blanking interval (VBI) scan line decoded each scan line within a given VBI using the same operational parameters, such as filter coefficients and run-in clock recovery parameters. The problem with these prior art methods is that each scan line was treated the same, even though certain scan lines within a given VBI typically exhibit different signal and content characteristics. The present invention provides for line-specific decoding of VBI scan lines. As such, each scan line within a given VBI is decoded using a set of operational parameters unique to that scan line number. These operational parameters are adjusted and maintained on a scan line by scan line basis.

20 Claims, 8 Drawing Sheets

U.S. PATENT DOCUMENTS

| | | | | |
|---|---|---|---|---|
| 5,331,416 A | * | 7/1994 | Patel et al. | 348/614 |
| 5,335,020 A | * | 8/1994 | Dieterich | 348/476 |
| 5,371,545 A | * | 12/1994 | Tults | 348/465 |
| 5,483,289 A | | 1/1996 | Urade et al. | 348/468 |
| 5,483,292 A | * | 1/1996 | Ko | 348/537 |
| 5,486,865 A | * | 1/1996 | James | 348/465 |
| 5,491,518 A | | 2/1996 | Kim | 348/607 |
| 5,506,626 A | * | 4/1996 | Yagi et al. | 348/464 |
| 5,512,954 A | | 4/1996 | Shintani | 348/468 |
| 5,517,249 A | * | 5/1996 | Rodriguez-Cavazos et al. | 348/465 |
| 5,521,645 A | * | 5/1996 | Ezaki | 348/465 |
| 5,537,151 A | | 7/1996 | Orr et al. | 348/564 |
| 5,552,726 A | | 9/1996 | Wichman et al. | 327/149 |
| 5,553,141 A | * | 9/1996 | Lowry et al. | 380/14 |
| 5,555,024 A | * | 9/1996 | Limberg | 348/473 |
| 5,555,025 A | * | 9/1996 | McArthur | 348/478 |
| 5,559,560 A | | 9/1996 | Lee | 348/465 |
| 5,561,469 A | * | 10/1996 | Schultz | 348/465 |
| 5,565,930 A | | 10/1996 | Bolger et al. | 348/572 |
| 5,589,886 A | * | 12/1996 | Ezaki | 348/461 |
| 5,590,154 A | | 12/1996 | Forni et al. | 375/229 |
| 5,600,380 A | * | 2/1997 | Patel et al. | 348/614 |
| 5,654,765 A | | 8/1997 | Kim | 348/614 |
| 5,657,088 A | | 8/1997 | Hankinson | 348/465 |
| 5,699,124 A | * | 12/1997 | Nuber et al. | 348/478 |
| 5,812,207 A | * | 9/1998 | Cahill, III | 348/465 |
| 5,812,217 A | * | 9/1998 | Cahill, III | 348/607 |
| 5,828,422 A | * | 10/1998 | Gaudreau | 348/614 |
| 5,835,153 A | * | 11/1998 | Pratt et al. | 348/468 |
| 5,838,382 A | * | 11/1998 | Cahill, III | 348/465 |
| 5,859,670 A | * | 1/1999 | Van Gestel | 348/473 |
| 5,883,675 A | * | 3/1999 | Herz et al. | 348/465 |
| 5,907,366 A | * | 5/1999 | Farmer et al. | 348/478 |
| 5,910,821 A | * | 6/1999 | Gyaramati | 348/468 |
| 5,926,491 A | * | 7/1999 | Cahill, III | 371/47.1 |
| 5,953,065 A | * | 9/1999 | Cahill, III | 348/478 |

* cited by examiner

METHOD AND APPARATUS FOR LINE-SPECIFIC DECODING OF VBI SCAN LINES

This application is a continuation-in-part of copending U.S. application Ser. No. 08/670,565, entitled METHOD AND APPARATUS FOR OPTIMIZING STARTING POINT FOR RUN-IN CLOCK RECOVERY, filed Jun. 26, 1996.

BACKGROUND OF THE INVENTION

1. Field of the Invention

The present invention relates to the field of television signal processing. More specifically, the present invention relates to line-specific decoding of a vertical blanking interval (VBI) scan line.

2. Background Information

Television transmission signals typically include a vertical blanking interval (VBI). The VBI refers to the time required by the electron gun in a conventional television set (or similar visual display) to reset itself to the top of the television screen from the bottom of the screen. Conventional television sets and many other visual displays generate their display by using an electron gun(s) to illuminate each line on the television screen. For instance, the National Television System Committee (NTSC) standard currently used in the United States illuminates every other scan line starting at the top of the screen, then resets itself to the top of the screen once it reaches the bottom. During this reset from the bottom of the screen to the top of the screen, no lines of the screen are being illuminated. This period of reset is referred to as the VBI.

Typically, a portion of the VBI is used by television broadcasters for control information necessary for displaying audio and video information. This control information includes, for example, vertical and horizontal synchronization signals. In addition, a portion of the VBI is typically reserved for broadcasting the text for closed captioning for the hearing impaired. However, unused time remains in the VBI which can be used by a broadcaster to broadcast any of a wide variety of data, typically referred to as teletext data, of the broadcaster's choosing.

A plurality of scan lines occur during the VBI. VBI scan lines are typically broadcast in accordance with one of a number of industry standard formats. For example, teletext scan lines are often broadcast in accordance with the North American Basic Teletext Specification (NABTS)[1]. Since hardware systems processing VBI scan lines typically operate with their own internal system clocks, virtually all industry standard formats call for the inclusion of a leading run-in clock at the beginning of a VBI scan line, to facilitate synchronization and decoding of the VBI scan line. For example, NABTS calls for a modulated data bit rate of 5.7272 MHz, and the inclusion of 8 run-in clock cycles at the beginning of a teletext scan line, followed by phase-aligned modulated data bits to be decoded.

[1] See Joint EIA/CVCC Recommended Practice for Teletext North American Basic Teletext Specification (NABTS), EIA-516, May 1988.

As such, a VBI decoder typically includes functions for recovering the starting point of the run-in clock. The VBI decoder adjusts the average starting point with the actual starting point of each run-in clock that is encountered. The decoder maintains the average starting point such that it can be used with each scan line. The run-in clock average starting point is one of many "operational parameters" that are utilized, adjusted, and maintained by the decoder in decoding a scan line. A typical prior art VBI decoder uses the same average starting point parameter for each scan line within the VBI. While the average starting point parameter may be adjusted after a predetermined period of time, only a single starting point parameter is used for each scan line.

A second operational parameter used in decoding the scan line is the average voltage level of the run-in clock. The run-in clock recovery portion of the VBI decoder may include a function for computing the average voltage level of the run-in clock. This average voltage level is then used as a threshold voltage during the decoding of the scan line data. For instance, if a voltage greater than the average voltage level is detected, it is considered a logical one. If a detected voltage is less than the average voltage level, it is considered a logical zero.

The average voltage level parameter may also be used in detecting the starting edge of the run-in clock for the following scan line. A typical prior art decoder uses the same average voltage level parameter from a first scan line for detecting the leading edge of the following scan line received. Although the average voltage level parameter may be adjusted with each scan line decoded, only a single average voltage level parameter is maintained.

Another set of operational parameters maintained by the scan line decoder are anti-ghosting filter parameters. Ghosting results from an echo(es) of the transmitted signal. Ghosting occurs when there is a reflection of a television signal or similar "bouncing" of the signal off of a particular object in or near the signal's path. Ghosting presents a problem when transferring data over the VBI because the reflected or echoed signal(s) interferes with the data being transmitted.

Several anti-ghosting mechanisms have been developed to reduce the effects of ghosting in a television transmission signal. Two such mechanisms are referred to as Adaptive Baseband Equalization (ABBE) filtering and Lookup Table (LUT) filtering. Both of these anti-ghosting filtering mechanisms look at one or more surrounding samples for a particular sample of data and perform various filtering processes using these bits to reduce the ghosting effects on the signal being transferred. Each of these filtering methods includes the step of applying one or more filter parameters to the scan line. The filter parameters are adjusted over time to ensure that the filtering methods remain effective.

Similar to the run-in clock characteristics, the same adjusted filter parameters are applied to each scan line received within a single VBI. Thus, a prior art decoder treats every scan line received as if it has similar signal characteristics, thus utilizing the same operational parameters.

However, with VBI transmissions, each scan line may have different characteristics based upon its content, source and transmission. For instance, the NABTS defines 21 scan lines that are available within a given VBI. Certain scan lines, or groups of scan lines, may be dedicated to a particular broadcaster. For instance, scan lines 10–13 may be dedicated to a first broadcaster, and scan lines 14–15 may be dedicated to a second broadcaster. Because the first and second broadcasters may have different encoding methods, scan lines 10–13 may have different characteristics than scan lines 14–15. Moreover, scan lines 10–13 may be transmitted over different transmission channels than lines 14–15, creating different signal characteristics. For example, a local broadcaster may insert teletext data on lines 10–13, while passing teletext data sourced from a nationwide network on lines 14–15.

As such, it is desirable to provide for line-specific decoding of scan lines broadcast within a VBI. It is further desirable to provide for a decoder that adjusts and maintains a separate set of operational parameters for each scan line received within a given VBI.

SUMMARY OF THE INVENTION

A system is programmed with a line-specific VBI scan line decoder. The decoder receives a scan line from a capture driver, the scan line having associated with it a scan line number. Using this scan line number as an index, the decoder retrieves a set of operational parameters from a storage medium. These operational parameters correspond only to the scan line number of the scan line received from the capture driver. The line-specific decoder then decodes the scan line using the operational parameters. For one embodiment, the decoding step also includes run-in clock recovery and anti-ghosting filtering. Once the scan line has been decoded, the operational parameters are adjusted based upon the results of the scan-line decoding.

DETAILED DESCRIPTION OF THE INVENTION

In the following description, various aspects of the present invention will be described in detail. For purposes of explanation, specific numbers, materials and configurations are set forth in order to provide a thorough understanding of the present invention. However, it will also be apparent to one skilled in the art that the present invention may be practiced without these specific details. In other instances, well known features are not set forth in detail in order not to obscure the present invention.

Various operations will be described as multiple discrete steps in turn in a manner that is most helpful in understanding the present invention, however, the order of description should not be construed as to imply that these operations are necessarily order dependent, in particular, the order of presentation.

The present invention includes a scan line decoder that decodes each scan line using line-specific operational parameters. Depending on the functionality of the decoder, the operational parameters may include anti-ghosting parameters, run-in clock recovery parameters, filter mode parameters, and diagnostic parameters. These various types of operational parameters will be discussed in more detail herein below.

Figure 4:
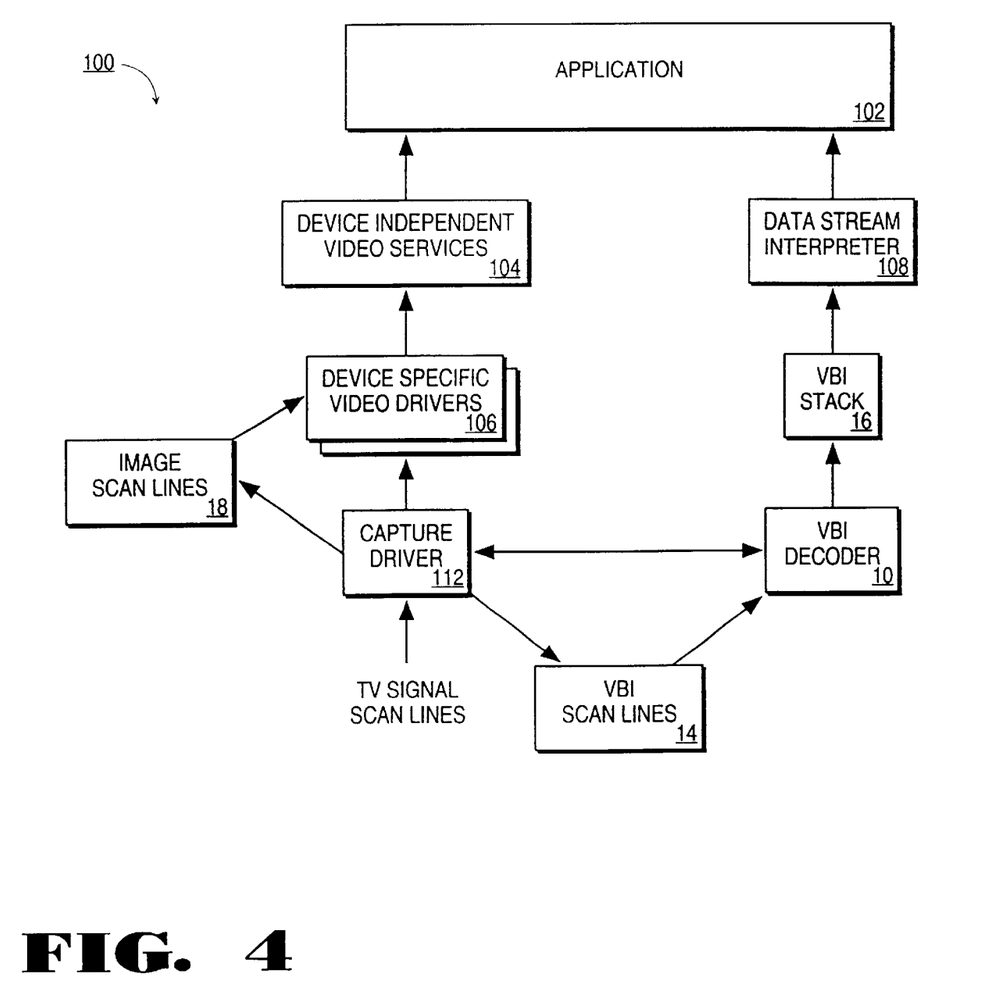
FIG. 4 is a block diagram illustrating one embodiment of a software environment suitable for practicing the present invention.

FIG. 4 illustrates a block diagram of a software environment suitable for implementing the present invention. As shown, software embodiment 100 includes common VBI scan line decoder 10 (hereinafter simply common decoder), and capture driver 112, cooperating with each other to generate image scan lines 18, and VBI scan lines 14. VBI scan lines 14 are decoded by decoder 10 into VBI stack 16. The functionality of the software environment 100 will be further described herein below with reference to FIG. 4.

Figure 1:
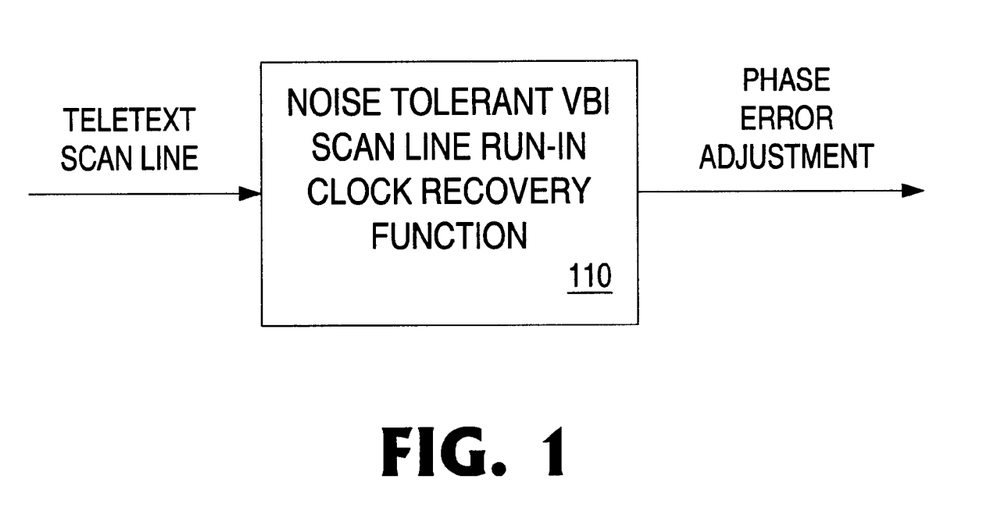
FIG. 1 is a block diagram illustrating an overview of a method of optimizing the starting point for run-in clock recovery.

Referring now to FIG. 1, a block diagram illustrating an overview of a run-in clock recovery function is shown. For one embodiment, the clock recovery function 110 is implemented within decoder 10 of FIG. 4. As shown, in accordance with a first aspect of the present invention, VBI scan line run-in clock recovery function 110 (hereinafter simply recovery function) recovers a leading run-in clock included at the beginning of a VBI scan line in a more accurate manner, tolerating the presence of noise in one or more of the clock cycles of the leading run-in clock. More specifically, for the illustrated embodiment, recovery function 110 determines the phase adjustment for reading sampling data, using only phase error observations that fall within a heavily populated phase error super-subrange, and excluding the remaining phase error observations from the determination, to be described more fully below. As will be appreciated by those skilled in the art, from the description to follow, recovery function 110 provides a more accurate approach to recovery of the leading run-in clock, and reduces unnecessary rejections of VBI scan lines. In recovering the run-in clock, the recovery function 110 utilizes one or more scan line-specific operational parameters. As described below, one such operational parameter is the average starting point of the run-in clock. Another operational parameter is the average voltage level of the run-in clock.

For one embodiment, recovery function 110 includes an optimization technique for optimizing the starting point for analyzing the run-in clock, thereby reducing CPU cycle consumption on unproductive analysis, as well as reducing susceptibility to noise before the start of the run-in clock.

Figure 2A:
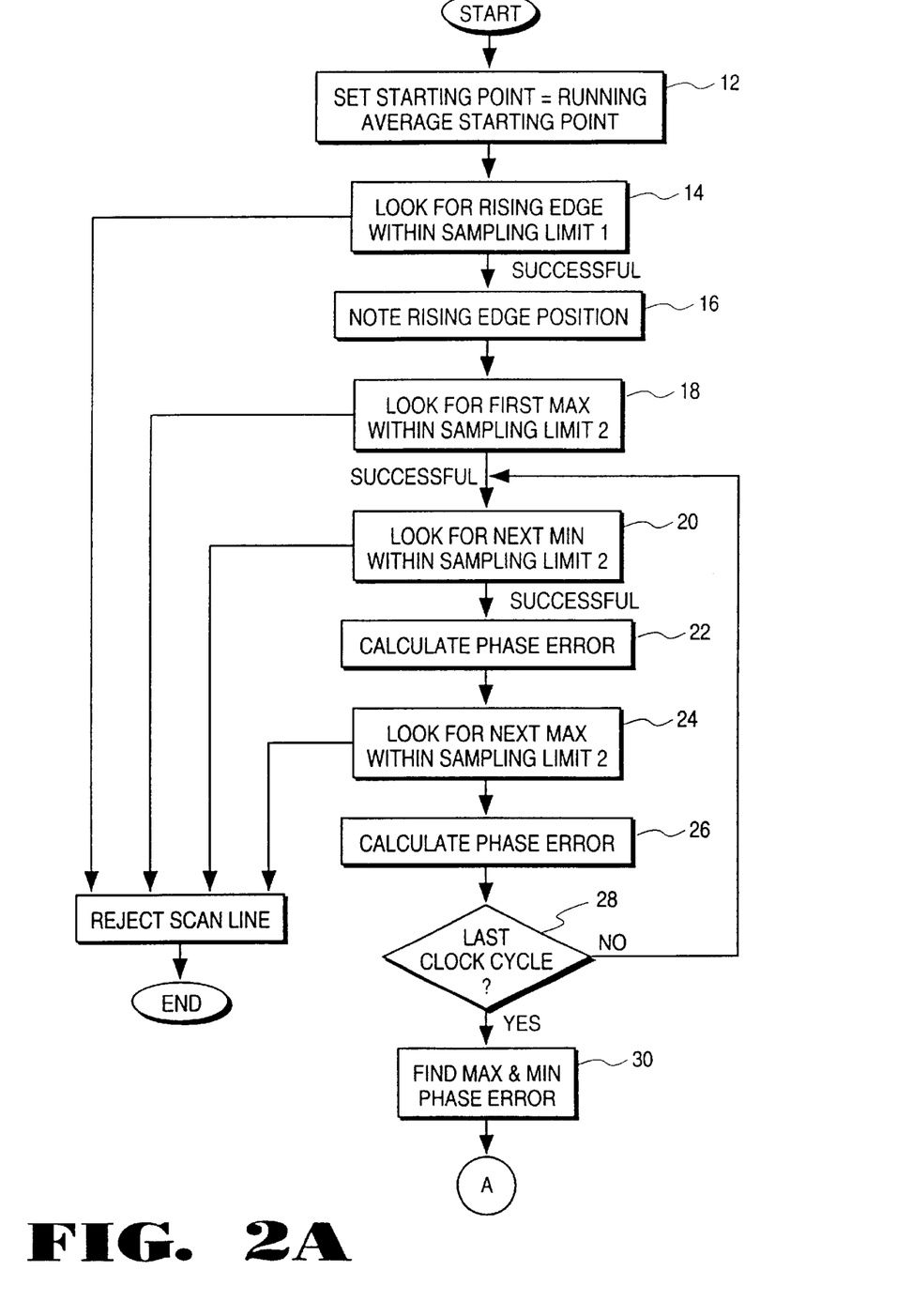
FIG. 2a is a flow diagram illustrating one embodiment of the operational steps of a noise tolerant run-in clock recovery function.
Figure 2B:
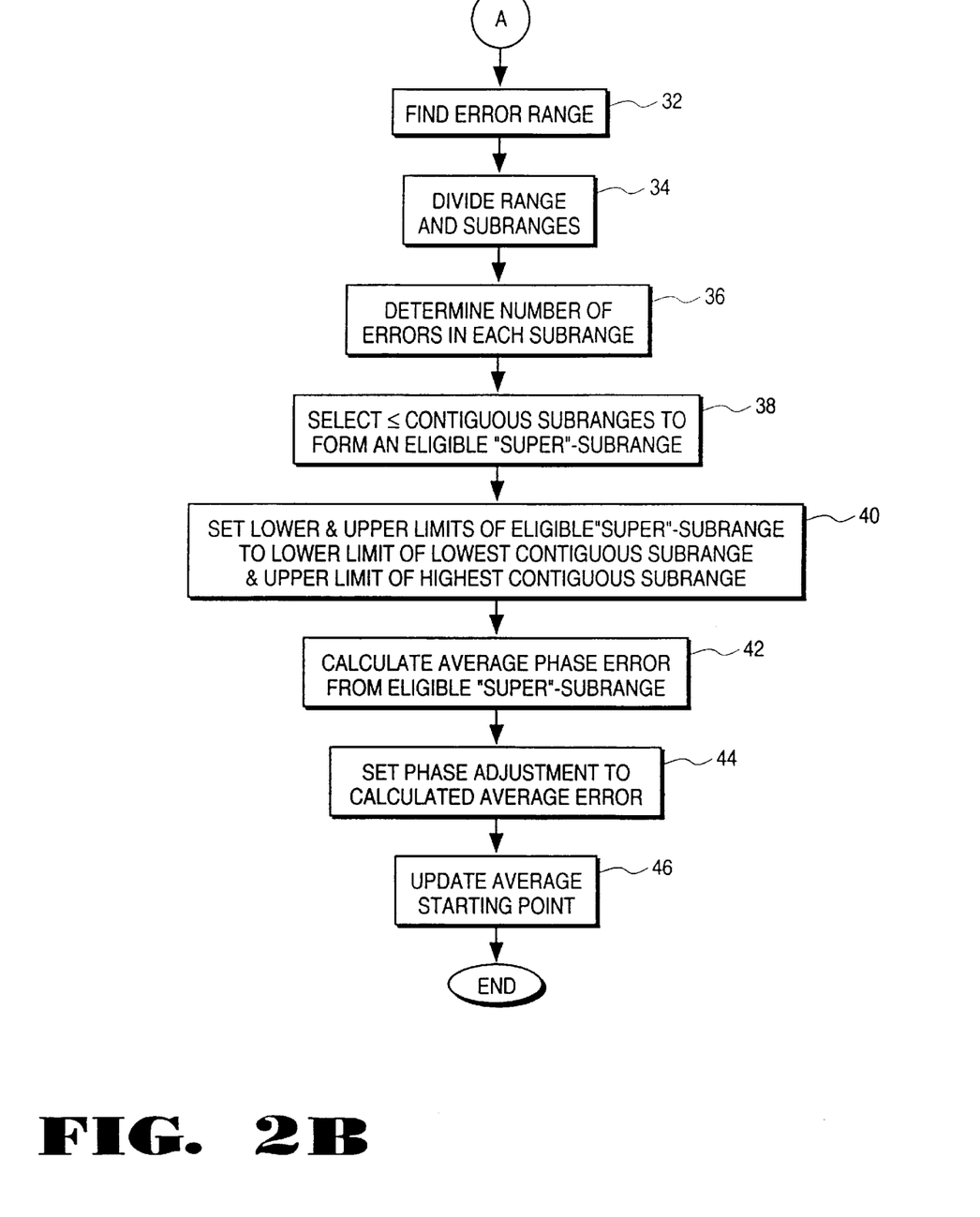
FIG. 2b is a flow diagram illustrating additional operational steps of the noise tolerant run-in clock recovery function of FIG. 2.
Figure 3:
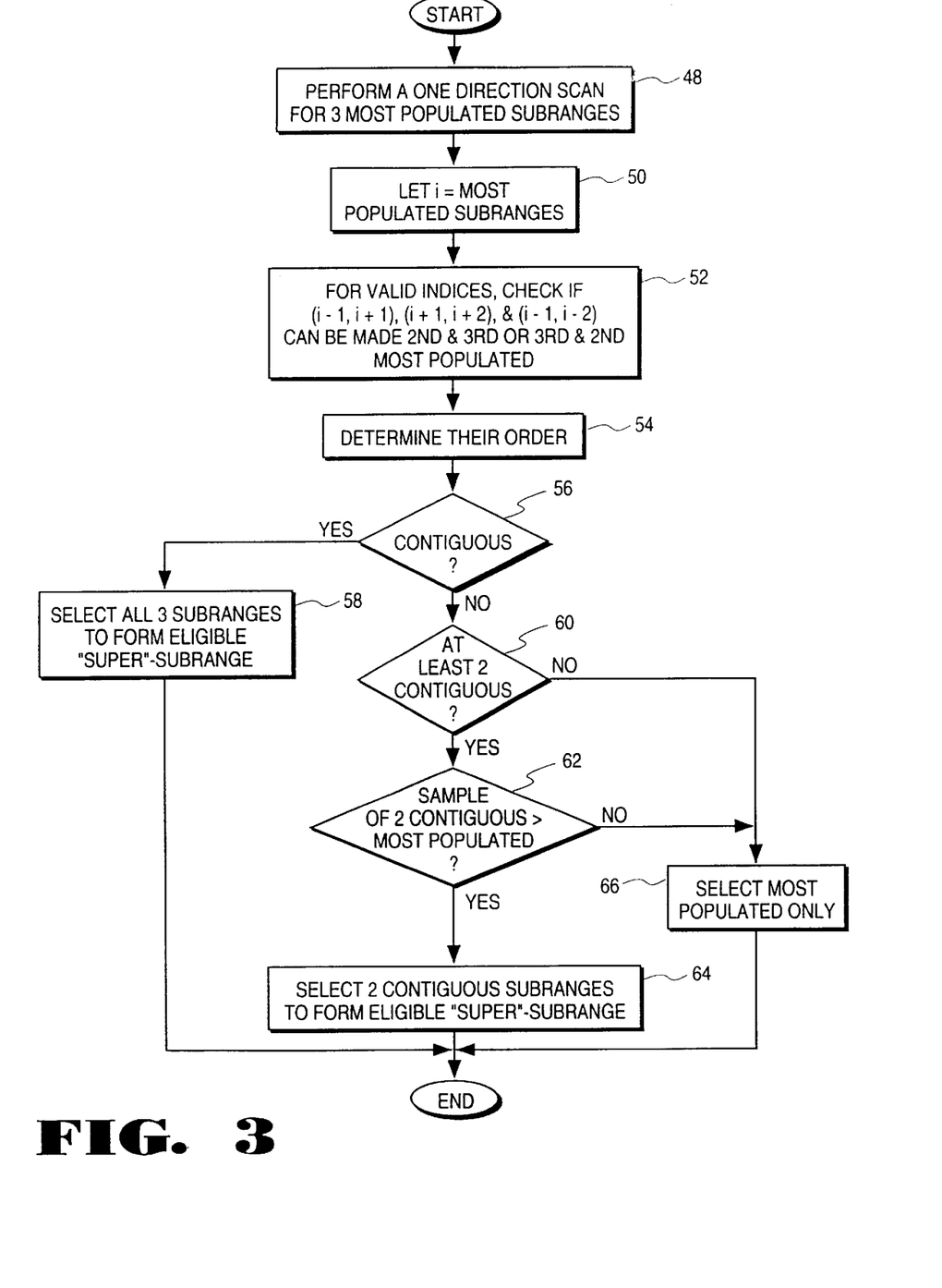
FIG. 3 is a flow diagrams illustrating one embodiment of the operational steps of a noise tolerant run-in clock recovery function.

Refer now to FIGS. 2a, 2b and 3, wherein one embodiment of the operational flow of recovery function 110 is illustrated. As shown in FIG. 2a, for the illustrated embodiment, upon invocation, recovery function 110 sets the starting point for analyzing the run-in clock to an average starting position maintained by recovery function 110, step 12. For the illustrated embodiment, the average starting point is set to the beginning of captured data for a scan line at initialization or reset.

In one embodiment, recovery function 110 further applies a safety threshold to the starting position to account for timing jitter from scan line to scan line or field to field, e.g. by subtracting a predetermined period from the current average starting position of the run-in clock.

Continuing to refer to FIG. 2a, having established the starting point, recovery function 110 looks for the first rising edge, step 14. For one embodiment, the first rising edge is detected by finding a voltage level that is higher than an average voltage level parameter, described in more detail below. If the first rising edge is found within a first sampling limit (window), recovery function 110 continues with step 16, otherwise, recovery function 110 rejects the scan line. At step 16, recovery function 110 notes the time position where the first rising edge was detected for the current scan line. In one embodiment, designed to support NABTS compliant teletext scan lines at an oversampling ratio of 5 to 1, the first sampling limit equals 128 samples.

Having located the first rising edge, recovery function 110 looks for the first maximum voltage, or "peak," step 18. Similarly, if the first peak is found within a second sample limit, recovery function 110 continues with step 20, otherwise, recovery function 110 rejects the scan line. In the above described NABTS supporting embodiment, the second sampling limit equals 7 samples.

Once the first peak is located, recovery function 110 looks for the peaks and minimum voltages ("valleys") for all successive clock cycles, steps 20–28. Similarly, for each peak/valley search, step 20 or 24, if the peak/valley is found within the second sample limit, recovery function 110 continues, otherwise, recovery function 110 rejects the scan line. Starting with the first valley, each time a valley is found, recovery function determines the phase error, step 22. Likewise, starting with the second peak, each time a peak is found, recovery function determines the phase error, step 26. Recovery function 110 continues this process, until the last clock cycle has been located, step 28. In the above described NABTS supporting embodiment, the last clock cycle is the 8th clock cycle.

The phase error computations of steps 22 and 26 may be performed according to any one of a number of known techniques. For example, phase error may be computed in accordance with the sample position and an estimated arctangent value (phase error=phase error+sample position+ estimated arctangent value). The estimated arctangent value represents the amount of "tilting" of a line connecting the pre-max/min value and the post-max/min value. The estimated arctangent value is computed from a fraction formed by the difference between a post-max/min value and a pre-max/min value, and the sum of the differences between the max/min value and the pre-max/min value, and the max/min value and the post-max/min value (fraction=(post max/min value−pre-max/min value)/((max/min value−pre-max/min value)+(max/min value−post max/min value))).

Having computed the phase errors from all peaks and valleys found, recovery function 110 determines the maximum and minimum phase errors, step 30. As shown in FIG. 2b, based on the maximum and minimum phase errors, recovery function 110 computes a phase error range, step 32. Then, recovery function 110 divides the phase error range into subranges, step 34, determines the number of phase errors in each subrange, step 36. For the illustrated embodiment, recovery function 110 divides the phase error range into 8 subranges.

Having found the population in each subrange, recovery function 110 selects N or less contiguous subranges to form an eligible phase error super-subrange, step 38. For the above described NABTS supporting embodiment, N equals 3 subranges. Having constructed the eligible phase error super-subrange, recovery function 110 sets the lower and upper phase error limits of the super-subrange to the lower limit of the lowest contiguous subrange and the upper limit of the contiguous subrange respectively, step 40.

Next, recovery function 110 calculates the average phase error, using only phase errors that fall within the eligible phase error super-subrange, and excluding all other phase errors, step 42, thereby excluding distortions in a few clock cycles due to the presence of noise, improving accuracy, and avoiding unnecessary rejections of scan lines. Recovery function 110 then sets phase adjustment to the calculated average phase error, step 44.

Finally, recovery function 110 updates the average starting point for analyzing the run-in clock, including the most recent position where the first rising edge of the run-in clock is found, step 46. In one embodiment, recovery function 110 further applies another safety threshold to the updated average starting point to prevent the average starting position to drift too far into the run-in clock, e.g. by limiting the start position to be no greater than a predetermined number of samples from the beginning of the captured scan line.

In one embodiment, recovery function 110 further periodically scans the pedestal data between the beginning of the captured scan line and the current average start position. If a rising edge is found in this region, the current average start position is set back to the position of that rising edge. A typical period for performing such scanning is 15 to 60 scan lines.

FIG. 3 illustrates one embodiment of step 38 in further detail. As shown, for the illustrated embodiment, recovery function 110 first performs a one direction scan for 3 most populated subranges, step 48. Then, recovery function 110 determines if the subranges adjacent to the most populated subrange can be substituted as the second and/or third most populated subranges, steps 50–52. The reason this "swapping" may be necessary is because subranges adjacent to the most populated subrange may not have been considered as the second or third most populated subrange, because their population was merely equal but not greater than a subrange earlier considered to be the second or third subrange. For example, if the one direction scan was from subrange 0 to subrange 7, subrange 1 has three phase error observations falling within its subrange, and subrange 5 is considered to be the most populated subrange by virtue of having four phase error observations falling within its subrange, subrange 6 would not be considered as the second most populated subrange during the one direction scan, even if it also has three phase error observations falling within its subrange, because the population count merely equals but not greater than the population count of subrange 1. In other words, in steps 50–52, if i is the subrange index of the most populated subrange, recovery function 110 examines if {i−1, i+1}, {i+1, i+2} and {i−1, i−2} can be considered as second and third or third and second most populated subranges (for all valid indices[2]).

[2]For i=0, i−1 and i−2 are invalid; likewise for i=7, i+1 and i+2 are invalid.

Having determined the three most populated subranges, recovery function 110 determines their order, i.e. first, second, and third, or, first, third and second, and so forth, most populated, step 54. Then, recovery function 110 determines if the three subranges are contiguous, step 56. If they are already contiguous, recovery function 110 selects all three subranges to form the eligible super-subrange, step 58. On the other hand, if the three subranges are not contiguous, recovery function 110 determines if at least two of the subranges are contiguous, i.e. low and mid subranges or mid and high subranges, step 60. If at least two of the subranges are contiguous, recovery function 110 further determines if the sum of the populations of the two contiguous subranges is greater than the single non-contiguous subrange, step 62. If the sum is greater, recovery function 110 selects the two contiguous subranges to form the eligible super-subrange, step 64. Otherwise, recovery function 110 selects the most populated subrange as the eligible super subrange, step 66.

In one embodiment, the above described recovery function 110 is invoked to recover the run-in clock, after a VBI scan line has been rejected using a conventional clock recovery approach. As will be appreciated by those skilled in the art, the recovery function 110 while more accurate will require more processing cycles, thus a hybrid approach may provide the desired improvement in accuracy without incurring significant increase to processing cycle requirement, particularly when noise occurs only intermittently.

The noise tolerant run-in clock recovery function is further described in copending U.S. patent application Ser. No. 08/670,564, entitled "Noise Tolerant Run-In Clock Recovery Method and Apparatus," filed on Jun. 26, 1996.

As was mentioned previously, a prior art VBI decoder included a recovery function 110 that used the same operational parameters for each scan line within a VBI. Once the recovery function 110 determined the average starting position parameter of a first VBI scan line, that parameter was utilized by the recovery function 110 for detecting the run-in clock of the following VBI scan line. Recall that because different scan lines within a given VBI may have different signal characteristics, different scan lines may have different average starting positions.

To provide for more accurate run-in clock detection and recovery, the present invention provides for a recovery function 110 that utilizes a scan line-specific average starting position parameter. For instance, the first scan line of each VBI has a particular average starting position parameter associated with it. The average starting position parameter is used to detect the starting position of the run-in clock, and then adjusted appropriately according to the method described above. The second, third, fourth, etc., scan lines of each VBI have their own unique average starting position parameters that are used by the clock recovery function 110. The present invention therefore takes into consideration the differences in signal characteristics, and thus starting positions, from one scan line to the next.

In addition to the starting position and phase error calculations described above, the recovery function 110 performs an average voltage level calculation of the run-in clock. The recovery function 110 keeps a running average of the voltage level of each cycle of the run-in clock. This running average is referred to as the average voltage level parameter. One prior art decoder includes a recovery function 110 that uses the average voltage level of a first VBI scan line to detect the rising clock edge of the first run-in clock for the following VBI scan line. However, because different scan lines within a given VBI may have different signal characteristics, the different scan lines may have different average voltage levels.

The present invention takes into consideration the different signal characteristics between the two VBI scan lines. The present invention maintains an average voltage level parameter unique to each scan line within a given VBI. As such, when the rising edge of the run-in clock for the first scan line is being detected, the recovery function 110 uses the average voltage level parameter associated with the first scan line. This average voltage level parameter is then adjusted according to the running average of the run-in clock for the first scan line. Similarly, the recovery function 110 detects the run-in clock of the second, third, fourth, etc., scan lines using average voltage parameters unique to each of these scan lines. The unique average voltage level parameters are adjusted and maintained on a scan line by scan line basis.

The average voltage level parameter is also used for data slicing, a process performed in decoding VBI scan line data. During data slicing, each scan line data value sampled by the decoder is compared with the average voltage level parameter to determine whether the sampled value is a logical one or logical zero. A decoder of the present invention performs data slicing using a unique average voltage level parameter for each scan line within a given VBI.

One embodiment of the invention includes a data array for storing the line-specific operational parameters. Thus, when the first scan line of each VBI is being decoded, the decoder accesses this data array to retrieve the unique operational parameters for scan line number one. Once the operational parameters have been adjusted, they are once again stored in the data array for use in decoding scan line number one of the next VBI.

Figure 6:
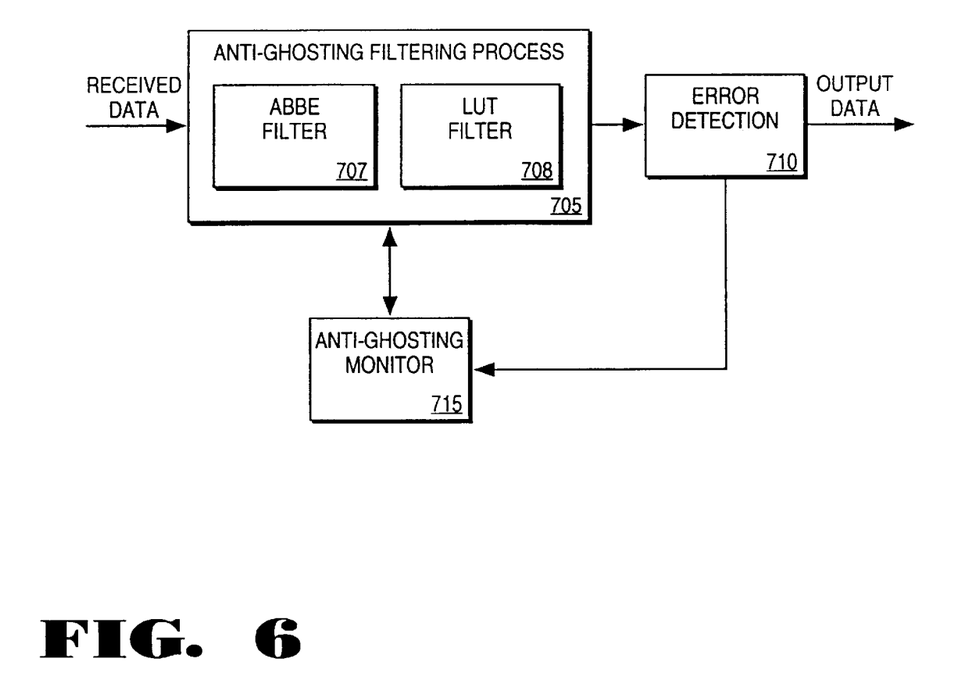
FIG. 6 is a block diagram illustrating an overview of an anti-ghosting filtering process of a scan line decoder.

In addition to the clock recovery and data-slicing functions described above, recall that the VBI scan line decoder 10 of FIG. 4 also performs anti-ghosting filtering. This anti-ghosting filtering process 705 is illustrated in FIG. 6.

Data is received during the vertical blanking interval from an NABTS signal. The data is filtered through the anti-ghosting filtering process 705, which includes two types of anti-ghosting filters. For the embodiment illustrated in FIG. 6, the anti-ghosting filtering process 705 includes both an Adaptive Baseband Equalization (ABBE) filter 707 and a Lookup Table (LUT) filter 708.

The anti-ghosted data is input to the error detection logic 710, which detects errors in the anti-ghosted data, and reports these errors to the anti-ghosting monitor 715. For one embodiment, the error reports generated by the error detection logic 710 are operational parameters, that are adjusted and maintained by the decoder on a scan line by scan line basis.

The anti-ghosting monitor 715 retrieves operational parameters for anti-ghosting filtering, called filtering parameters, used by the ABBE filter 707 and the LUT filter 708. The anti-ghosting monitor 715 updates the filtering process 705 based upon these filtering parameters as well as errors reported by the error detection logic 710. For the ABBE filter 707, the filtering parameters comprise one or more ABBE coefficients that are multiplied by a scan-line value currently being sampled to create an ABBE-filtered value. For the LUT filter 708, the filtering parameters comprise one or more LUT coefficients that are values stored within a lookup table. The LUT coefficients are added to the ABBE filtered value, resulting in an anti-ghosted value.

The ABBE and LUT filtering parameters are slowly trained over time. The filter parameters are adjusted based upon comparison of the filtered value with a predetermined value. For the present embodiment of the invention, a unique set of filtering parameters are adjusted and maintained for each specific scan line that is decoded. Thus, the first scan line within a given VBI has a first set of filtering parameters associated with it, as well as the second, third, fourth, etc., scan lines within a given VBI. The training of anti-ghosting filtering is described in more detail in copending U.S. patent application Ser. No. 08/670,563, entitled "A Self-Correcting Anti-Ghosting Process," filed Jun. 26, 1996.

As was mentioned previously, the error detection logic 710 is responsible for detecting errors in the anti-ghosting filtering process 705, and reporting these errors to the anti-ghosting monitor 715. For one embodiment, the error detection logic 710 includes four types of error checking: (1) frame code checking, (2) Hamming coding of certain bytes, (3) test patterns, and (4) forward error correction.

In response to the errors reported by the error detection logic 710, the anti-ghosting monitor 715 adjusts the level of filtering, or "filter mode," provided by anti-ghosting filtering process 705. Each filter mode provides a different level of anti-ghosting filtering, based upon need. For instance, the number of coefficients used by the ABBE filter 707 may be increased if more errors are reported, or decreased if less errors are reported. The LUT filter 708 may be turned on if more errors are reported, or disabled if less errors are reported. This adaptive filter mode process is described in more detail in copending U.S. application Ser. No. 08/672,257, entitled "A Mechanism for Adaptive Selection of Anti-Ghosting Filtering," filed Jun. 26, 1996.

One or more operational parameters are used to indicate which filter mode the anti-ghosting filtering process 705 is in. For one embodiment, the filter mode is indicated by a scan line specific filter mode parameter that is used by the anti-ghosting filtering process 705 to determine the level of filtering to apply to a certain scan line. This unique filter mode parameter is adjusted and maintained for each scan line. As such, the first scan line within a given VBI has a unique filter mode parameter associated with it, as well as the second, third, fourth, etc., scan lines within a given VBI.

Figure 7:
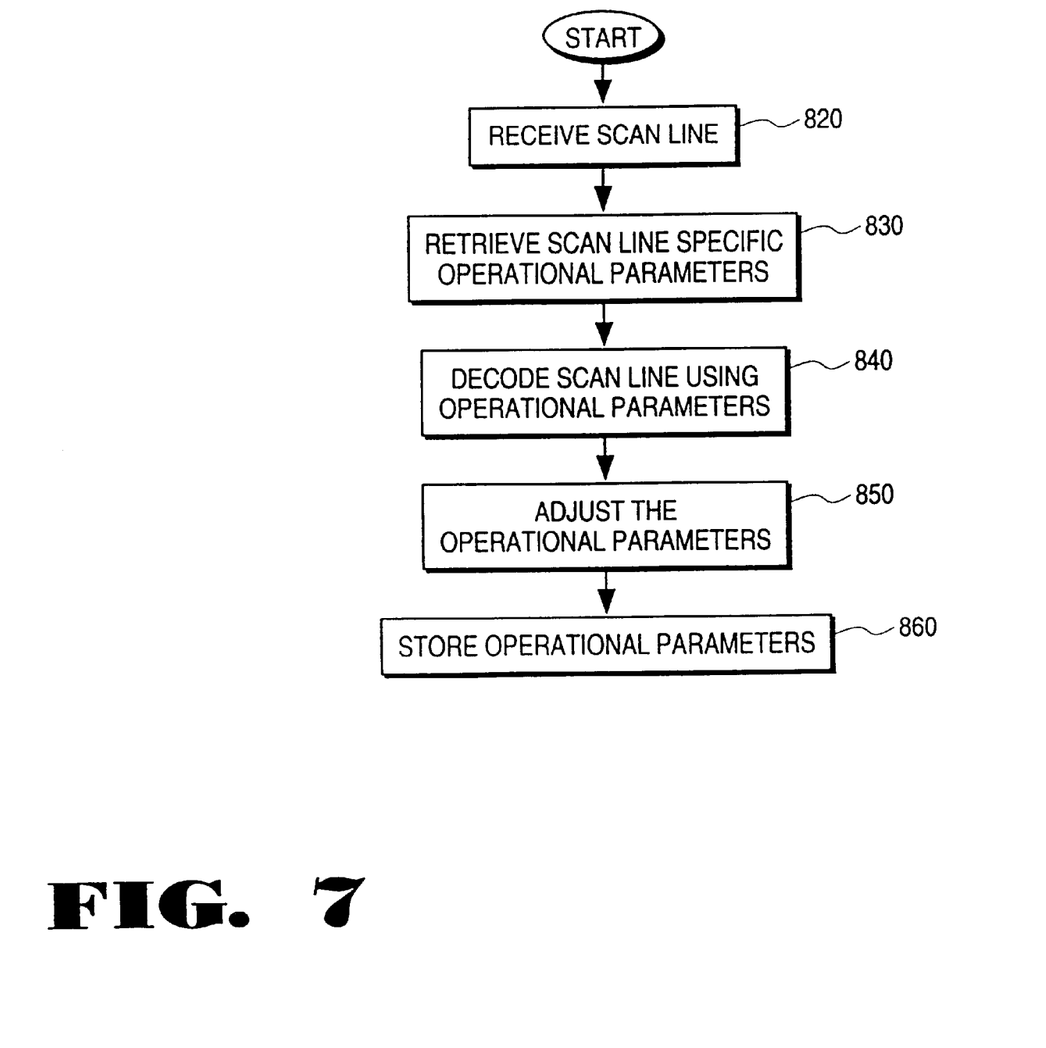
FIG. 7 is a flow diagram illustrating one embodiment of the operational steps of the line-specific decoder of the present invention.

FIG. 7 illustrates one embodiment of the operational steps of the line-specific decoder of the present invention. The line-specific decoder starts its function at step 820, when receiving a scan line of data. As was mentioned previously, the VBI scan line is typically captured by a capture driver and then input to the scan line decoder at step 820. The capture of VBI scan lines is well-known in the prior art and therefore will not be discussed in detail herein.

The scan line decoder then retrieves the line-specific operational parameters associated with the scan line being decoded at step 830. For one embodiment, step 830 is accomplished by first determining a scan line number associated with the scan line. For one embodiment, the decoder maintains a counter value that keeps track of each scan line of data received from the capture driver. The counter value is incremented once for each scan line received, and the counter value is reset at the beginning of each VBI. Thus, the counter value indicates the scan line number corresponding to the scan line received. For one embodiment, the vertical blanking interval comprises 21 scan lines. The first scan line would be designated as scan line number one, the second as scan line number two, etc. For another embodiment, VBI scan lines 1–9 are not used. Therefore, the line number corresponding to the first entry in the data array of operational parameters starts with the tenth scan line received.

Once the scan line number is determined, the scan line number, or a value derived from the scan line number, is used to index a data array of operational parameters stored in a storage medium. The appropriate line-specific operational parameters are retrieved from the data array and used in decoding the scan line at step 840. For one embodiment, the data array is stored within system memory 214 of FIG. 5, which may comprise, for instance, dynamic random access memory (DRAM).

As was mentioned herein above, the operational parameters may comprise a number of various parameters used for filtering, clock recovery, filter mode, and diagnostics. For example, the following Tables 1–4 illustrate various operational parameters maintained separately for each VBI scan line. The discussion following Tables 1–4 will refer to the "current VBI scan line;" meaning the particular scan line number currently being decoded.

Table 1-filter Parameters

| Filter Parameter | Description |
| --- | --- |
| ABBECoeffs | One or more ABBE filter coefficients |
| LUTCoeffs | One or more LUT filter coefficients |

Table 2 - Clock Recovery Parameters

| Clock Recovery Parameter | Description |
| --- | --- |
| AvgStart | Average run-in clock start time |
| DCAVg | Average run-in clock DC Voltage level |

Table 3 - Filter Mode Parameters

| Filter Mode Parameter | Description |
| --- | --- |
| GhostMode | Level of filtering to use for VBI scan line |
| FCErr | Snapshot of last frame code error |
| CorrHamFrr | Snapshot of last Hamming code error |
| UncHamErr | Snapshot of last uncorrectable Hamming code error |
| FCCnt | Ongoing updated frame code error count |
| CorrHamCt | Ongoing updated hamming code error count |
| UncHamCt | Ongoing updated uncorrectable Hamming code error count |

| Diagnostic Parameter | Description |
| --- | --- |
| TotalPackAtt | Total number of packets scanned or attempted |
| IndicPackCnt | Packet count indicated as successfully decoded |
| NABTSPackCnt | Number of NABTS packets received |
| UnkPackCnt | Total number of unkown frame code packets |
| AbortPackCnt | Aborted Packet Count |
| Over4HammErr | Too many Hamming Errors |
| NoFC | No valid Frame code found |
| RejectNABTSFC | NABTS Frame code rejected |
| RejectAdd | Packet Address Rejected |
| DataDecErr | Data Decode Error detected |
| NoClkErr | No clock found during clock recovery |
| BadAmp | Bad amplitude during clock recovery |
| SoftErr | Unexpected software error occurred during decode |
| Minclk | Minimum clock level found during clock recovery |
| Maxclk | Maximum clock level found during clock recovery |
| Avgclk | Average clock level found during clock recovery |
| AvgLevHist | Histogram of average signal level detected |

Table 1 illustrates two types of filter parameters that are used in the anti-ghosting filtering process (see, e.g., FIG. 6), which is invoked during the decode step 840. The ABBE coefficients (ABBECoeffs) are employed by the ABBE filter, and the LUT coefficients (LUTCoeffs) are employed by the LUT filter. Recall that the number of ABBE filter coefficients, and the type of filter used, will vary depending on the level of filtering selected for the VBI scan line. For instance, the LUT filter may be completely disabled at times. The filter mode parameter (GhostMode, Table 3) is therefore used in conjunction with the filter parameters in performing anti-ghosting filtering on the current VBI scan line.

Recall that the LUT coefficients used by the LUT filter are typically kept in a lookup table. Depending on the particular implementation of the LUT filter, the lookup table can be large, taking up a lot of space in memory. Thus, for one embodiment of the invention, only the ABBE coefficients, and not the LUT coefficients, are maintained on a scan line by scan line basis.

Table 2 illustrates the clock recovery parameters that are used by the clock recovery function (see, e.g., FIG. 1), which is invoked during the decode step 840. The average start parameter (AvgStart) indicates the average starting position of the run-in clock for the current VBI scan line being decoded. The average voltage level parameter (DCAvg) indicates the average voltage level of the run-in clock for the current VBI scan line being decoded. Recall that the average voltage level may be used both in detecting the rising edge of the first run-in clock, and also in data slicing during decoding of the current VBI scan line data.

Table 3 illustrates the filter mode parameters that are used by the anti-ghosting filtering process (see, e.g., FIG. 6), which is invoked during the decode step 840. As was mentioned previously, the ghost mode parameter (Ghost-Mode) indicates a level of anti-ghosting filtering to be applied to the current VBI scan line being decoded. For instance, the number of filter coefficients used by the ABBE filter may vary. Additionally, the LUT filter may be enabled or disabled.

As was described herein above, error detection logic 710 of FIG. 6 performs error checking on the current VBI scan line data. The results of the error checking, "error parameters," are then used during the decode step 840 to determine the level of filtering to be applied to the VBI scan line. Three error parameters in Table 3 provide an ongoing picture of the error checking. The frame code error count (FCCnt), the Hamming code error count (HamCt) and the uncorrectable Hamming code error count (UncHamCt) parameters indicate the ongoing values of the various types of error checking performed on the current VBI scan line. Three more error parameters in Table 3 are used to provide a periodic snapshot picture of the error count occurring during decode. The frame code error (FCErr), the correctable Hamming code error (CorrHamErr) and the uncorrectable Hamming code error (UncHamErr) parameters provide the snapshot information.

As was described herein above, the error parameters partially determine the level of filtering to be applied to the current VBI scan line. The ghost mode parameter also indicates the level of filtering to be applied to the current VBI scan line.

For one embodiment of the invention, the error parameters are maintained on a scan line by scan line basis in order to provide for diagnostic monitoring. Diagnostic software routines can access the error parameters for each individual scan line to determine whether a certain scan line (e.g., scan line number one) has a higher error count than other scan lines. Additionally, such diagnostic software routines can attempt to find correlations between error parameters and signal characteristics for a given VBI scan line. The knowledge gained from these diagnostic parameters can be used to fine-tune the algorithm used in the decoding step 840 for each scan line number within a given VBI. Additionally, a user can monitor the diagnostic parameters to determine which scan lines of the VBI contain usable information, to determine how the antenna should be tuned, etc.

Table 4 includes more diagnostic parameters for monitoring statistics related to the decode step 840 performed on the current VBI scan line.

The diagnostic parameters also include statistics about the scan line data that is decoded. For one embodiment "packet" refers to the data contained within the current VBI scan line. Table 4 includes the total number of data packets attempted to be decoded (TotalPackAtt), the packet count indicated (IndicPackCnt), and number of NABTS packets received (NABTSPackCnt), the number of unknown frame code packets encountered (UnkPackCnt), and the total number of aborted packets (AbortPackCnt).

The diagnostic parameters of Table 4 include errors that occurred during the decode step 840. The Hamming error parameter (Over4HammErr) indicates that too many Hamming errors (e.g., over 4) were encountered while decoding the current scan line number. Moreover, the frame code error (NoFC) indicates that no frame code was found for the current VBI scan line. The frame code reject (Reject-NABTSFC) parameter indicates that the NABTS frame code was rejected during decode. The packet address reject (RejectAdd) indicates that the packet address was rejected during decode. The data decode error (DataDecErr) parameter signals that an error was incurred during the decoding of the packet during decode step 840. When an unexpected software error occurs during decode step 840, this is indicated by the software error parameter (SoftErr).

For one embodiment, the diagnostic parameters also include clock recovery errors such as the no clock (NoClkErr) parameter and the bad amplitude (BadAmp) parameter. Moreover, the diagnostic parameters may include clock recovery statistics such as minimum clock level (Minclk), maximum clock level (Maxclk), and average clock level (Avgclk). An average signal level histogram (AvgLevHist) parameter is also maintained.

It should be appreciated that the diagnostic parameters of Table 4 are typically used as debug and analysis tools for improving upon decoding of VBI scan lines. As such, certain ones of the diagnostic parameters will prove to be more or less useful, depending on the implementation-specific details of each VBI scan line decoder. It should therefore be appreciated that the list of diagnostic parameters of Table 4 may be increased or decreased, according to individual need, without departing from the scope of the present invention. For instance, one may find it useful to maintain a number of histograms for various signal parameters in order to fine-tune the line-specific decoding of the present invention.

The operational parameters discussed with reference to Tables 1–4 above are meant to be exemplary of the types of parameters that would be useful to maintain on a scan line by scan line basis. It should be appreciated, however, that the number and type of operational parameters used in the scan line specific decoder of the present invention may vary without departing from the scope of the invention. For instance, for one embodiment, the operational parameters maintained on a scan line by scan line basis may include only the filter parameters, wherein the other parameters are applied to each scan line within a given VBI, in accordance with prior art decoding methods.

Once the scan line has been decoded according to scan line specific operational parameters, the operational parameters are adjusted at step 850 of FIG. 7. For example, the ABBE and LUT filter parameters of Table 1 and the filter mode parameters of Table 3 are adjusted according to the results of error detection logic 710 of FIG. 6. The clock recovery parameters of Table 2 are adjusted based on the run-in clock of the current VBI scan line. The diagnostic parameters of Table 4 are adjusted to reflect any new statistics or errors incurred during the decode step 840.

For one embodiment of the invention, the one or more of the operational parameters are not adjusted each time a scan line is decoded. For instance, the filter parameters for scan line number one may only be adjusted every third time scan line number one is decoded. For this embodiment, the decoder keeps track of the number of times scan line number one has been decoded, and only adjusts the filter parameters on the third time.

Once the set of operational parameters have been adjusted at step 850, they are once again stored in a storage medium at step 860. As described previously, for one embodiment the data array of operational parameters are stored such that they may be indexed by the scan line number of the current VBI scan line, or a value derived from the current scan line number. For instance, the operational parameters associated with scan line number one of a given VBI comprise the first entries within the data array of operational parameters. For an alternate embodiment of the invention, the operational parameters associated with the tenth scan line received comprise the first entries within the data array.

Referring now to FIG. 4, wherein a block diagram illustrating one embodiment of a software environment suitable for practicing the present invention is shown. As shown, software embodiment 100 includes common VBI scan line decoder 10 (hereinafter simply common decoder), capture driver 112, cooperating with each other to generate image scan lines 18, and VBI scan lines 14. VBI scan lines 14 are decoded by decoder 10 into VBI stack 16. Decoded scan lines are in turn interpreted by data stream interpreter 108. Common decoder 10 and capture driver 12 are disclosed in copending U.S. patent application Ser. No. 08/670,568, entitled, "Method And Apparatus For Common Vertical Blanking Interval Scan Line Decoding," filed Jun. 26, 1996.

Additionally, image scan lines 18 are processed by device specific video drivers 106, e.g. VfW drivers that implement Microsoft DirectX™ video support, which in turn provides the processed data to a device independent video service 104, e.g. Microsoft Video for Windows. The device independent video service 104 then generates the television images for application 102. With respect to the decoded teletext (including closed captions), data stream interpreter 108 interprets the decoded teletext for application 102.

Figure 5:
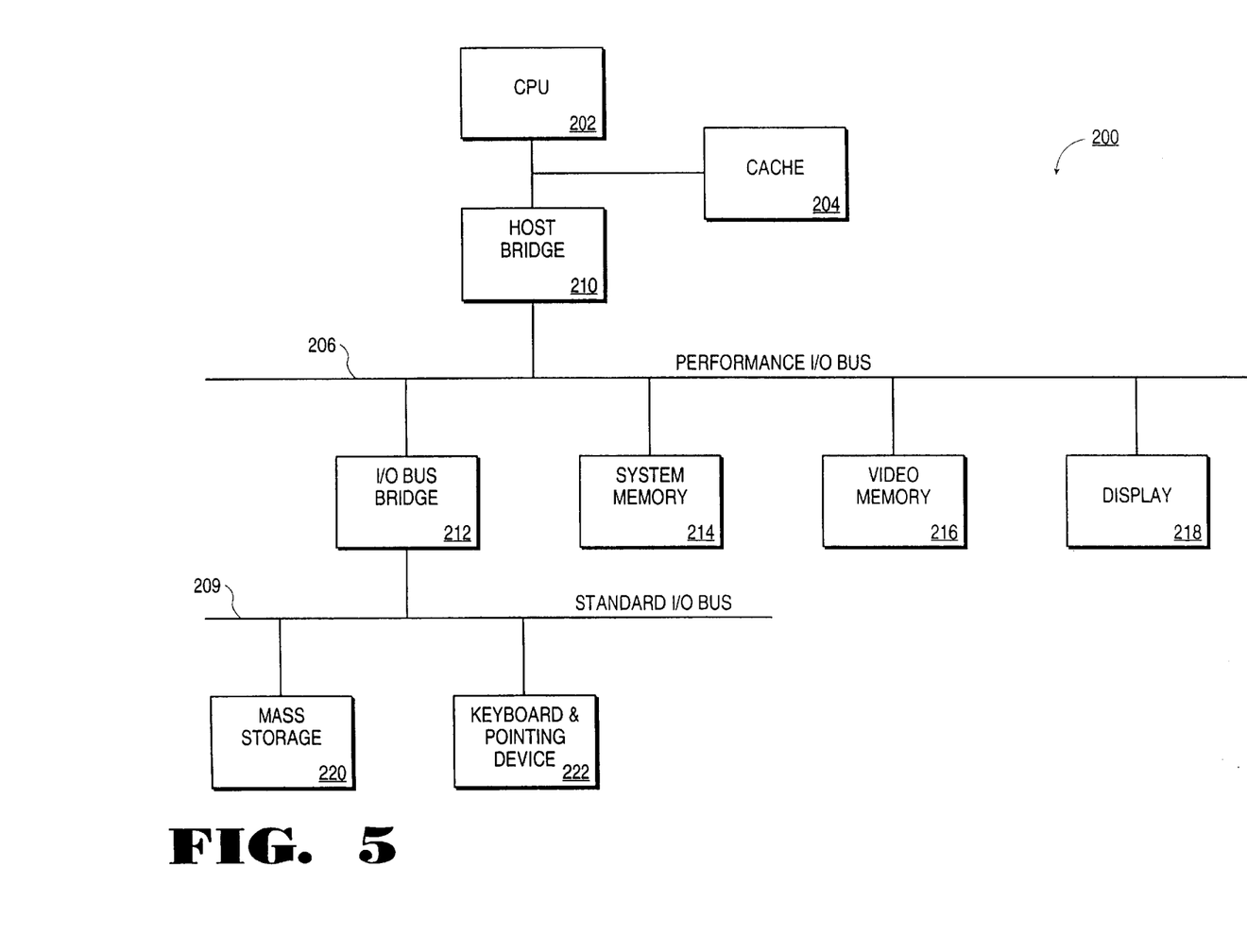
FIG. 5 is a block diagram illustrating one embodiment of a hardware system suitable for programming with the software environment of FIG. 4.

FIG. 5 illustrates one embodiment of a hardware system suitable for programming with the software elements of FIG. 4. As shown, for the illustrated embodiment, hardware system 200 includes CPU 202 and cache memory 204 coupled to each other as illustrated. Additionally, hardware system 200 includes high performance I/O bus 206 and standard I/O bus 209. Host bridge 210 couples CPU 202 to high performance I/O bus 206, whereas I/O bus bridge 212 couples the two buses 206–208 to each other. Coupled to bus 206 are system memory 214 and video memory 216. In turn, display device 218 is coupled to video memory 216. Coupled to bus 208 is mass storage 220 and keyboard and pointing device 222.

These elements 202–222 perform their conventional functions known in the art. In particular, mass storage 220 is used to provide permanent storage for the programming instructions implementing the above described functions, whereas system memory 214 is used to provide temporary storage for the programming instructions when executed by CPU 202. Mass storage 220 may be provided with the programming instructions by loading the programming instructions from a distribution storage medium (not shown), or by downloading the programming distributions from a server (not shown) coupled to hardware system 200 via a network/communication interface (not shown). Collectively, these elements are intended to represent a broad category of hardware systems, including but not limited to general purpose computer systems based on the Pentium™ processor or Pentium Æ Pro processor, both manufactured by Intel Corporation of Santa Clara, Calif., assignee of the present invention.

Thus, a method and apparatus for line-specific decoding of VBI scan lines has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method of decoding data broadcast within a vertical blanking interval (VBI), comprising:

determining a set of operational parameters for each scan line within the VBI based on unique signal characteristics of said each scan line, the unique signal characteristics being associated with content, source and transmission of said each scan line;

storing the set of operational parameters in a storage medium using a scan line number associated with said each scan line;

receiving a scan line of a subsequent VBI from a capture driver, said scan line having associated with it a scan line number;

retrieving a set of operational parameters from said storage medium, said set of operational parameters corresponding to said scan line number;

decoding said scan line using said set of operational parameters to create a decoded scan line;

adjusting said set of operational parameters based upon the results of the decoding of said scan line; and replacing said set of operational parameters associated with said scan line number in said storage medium with said adjusted set of operational parameters.

2. The method of claim 1, wherein step (C) includes the step of filtering said scan line using an Adaptive Baseband Equalization (ABBE) filtering method.

3. The method of claim 1, wherein step (C) includes the step of filtering said scan line using a Lookup Table (LUT) filtering method.

4. The method of claim 1, wherein adjusting said set of operational parameters includes:

error checking the decoded scan line; and enabling a level of filtering, corresponding only to said scan line, based upon the results of said error checking.

5. The method of claim 1, wherein said set of operational parameters includes one or more Adaptive Baseband Equalization (ABBE) filtering coefficients.

6. The method of claim 1, wherein said set of operational parameters includes one or more lookup table (LUT) filtering parameters.

7. The method of claim 1, wherein step (C) includes recovering a run-in clock associated with said scan line.

8. The method of claim 7, wherein said set of operational parameters includes one or more clock recovery parameters.

9. The method of claim 8, wherein said clock recovery parameters include an average starting point of a run-in-clock.

10. The method of claim 8, wherein said clock recovery parameters include an average voltage level of a run-in-clock.

11. The method of claim 1, wherein said set of operational parameters includes one or more mode parameters that indicate a level of filtering to be applied to said scan line.

12. The method of claim 1, wherein said set of operational parameters includes one or more diagnostic parameters that indicate errors that occurred while decoding said scan line, and adjusting said set of operational parameters includes adjusting said diagnostic parameters to reflect the occurrence of said errors.

13. An apparatus comprising:

an execution unit that executes programming instructions; and a storage medium coupled to the execution unit, having stored therein a plurality of programming instructions implementing a scan line decoder that decodes each of a set of scan lines broadcast within a vertical blanking interval (VBI) according to scan line-specific operational parameters, wherein each set of said scan line-specific operational parameters is determined based on unique signal characteristics associated with content, source and transmission of a particular scan line within said set of scan lines, is using a scan line number associated with said particular scan line, is used in decoding a scan line associated with said scan line number of a subsequent VBI, is adjusted based upon the results of the decoding of said scan line, and is stored as adjusted using said scan line number.

14. The apparatus of claim 13, wherein said operational parameters include one or more Adaptive Baseband Equalization (ABBE) filter coefficients for performing anti-ghosting filtering on each of said scan lines.

15. The apparatus of claim 13, wherein said operational parameters include one or more lookup table (LUT) filtering parameters for performing anti-ghosting filtering on each of said scan lines.

16. The apparatus of claim 13, wherein said set of operational parameters includes one or more clock recovery parameters.

17. The apparatus of claim 16, wherein said clock recovery parameters include an average starting point of a run-in-clock.

18. The apparatus of claim 16, wherein said clock recovery parameters include an average voltage level of a run-in-clock.

19. The apparatus of claim 13, wherein said operational parameters include one or more filter mode parameters that indicate a level of filtering to be applied to each of said scan lines.

20. The apparatus of claim 14, wherein said operational parameters include one or more diagnostic parameters that indicate errors incurred while decoding each of said scan lines.

* * * * *

UNITED STATES PATENT AND TRADEMARK OFFICE
CERTIFICATE OF CORRECTION

PATENT NO. : 6,377,308 B1
DATED : April 23, 2002
INVENTOR(S) : Cahill, III

It is certified that error appears in the above-identified patent and that said Letters Patent is hereby corrected as shown below:

Column 14,
Line 32, delete "step (C) includes the step of", insert -- decoding said scan line includes --.
Line 35, delete "step (C) includes the step of", insert -- decoding said scan line includes --.
Line 49, delete "step (C)", insert -- decoding said scan line --.

Signed and Sealed this

Twenty-fourth Day of December, 2002

JAMES E. ROGAN
*Director of the United States Patent and Trademark Office*